Sept. 9, 1958 W. M. GREENSLATE 2,851,067
CHAIN SAW TABLE
Filed July 9, 1956 3 Sheets-Sheet 1
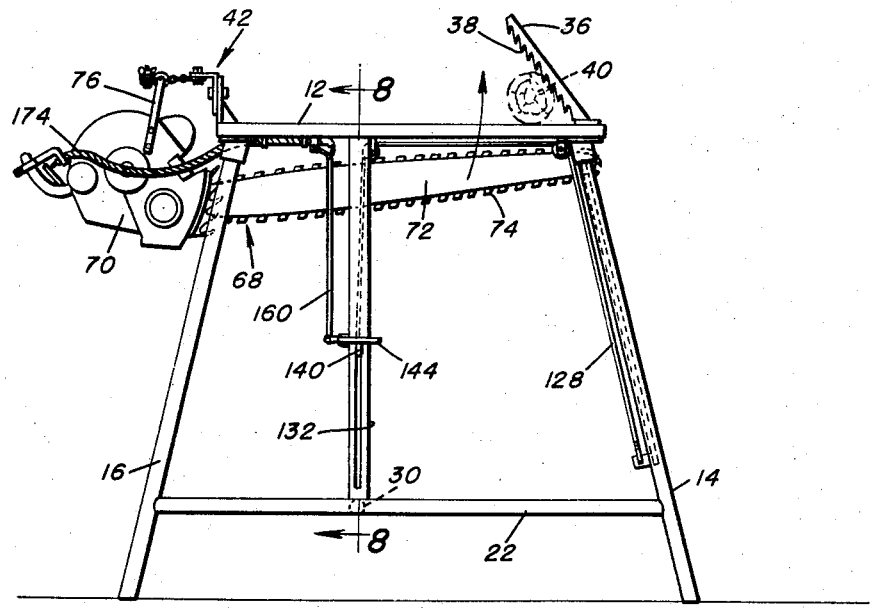
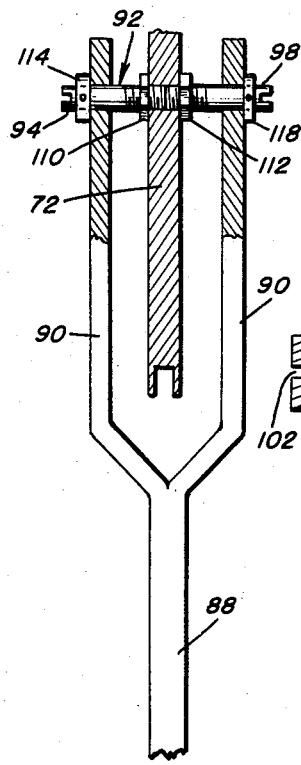
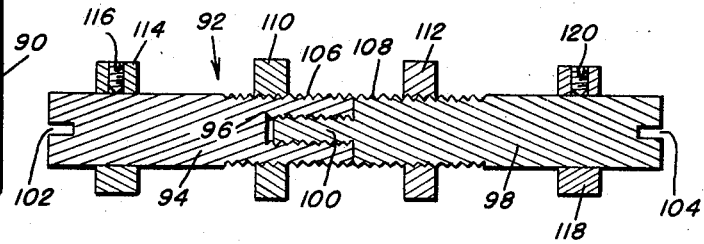
Wesley M. Greenslate
INVENTOR.

Sept. 9, 1958  W. M. GREENSLATE  2,851,067
CHAIN SAW TABLE
Filed July 9, 1956  3 Sheets-Sheet 2
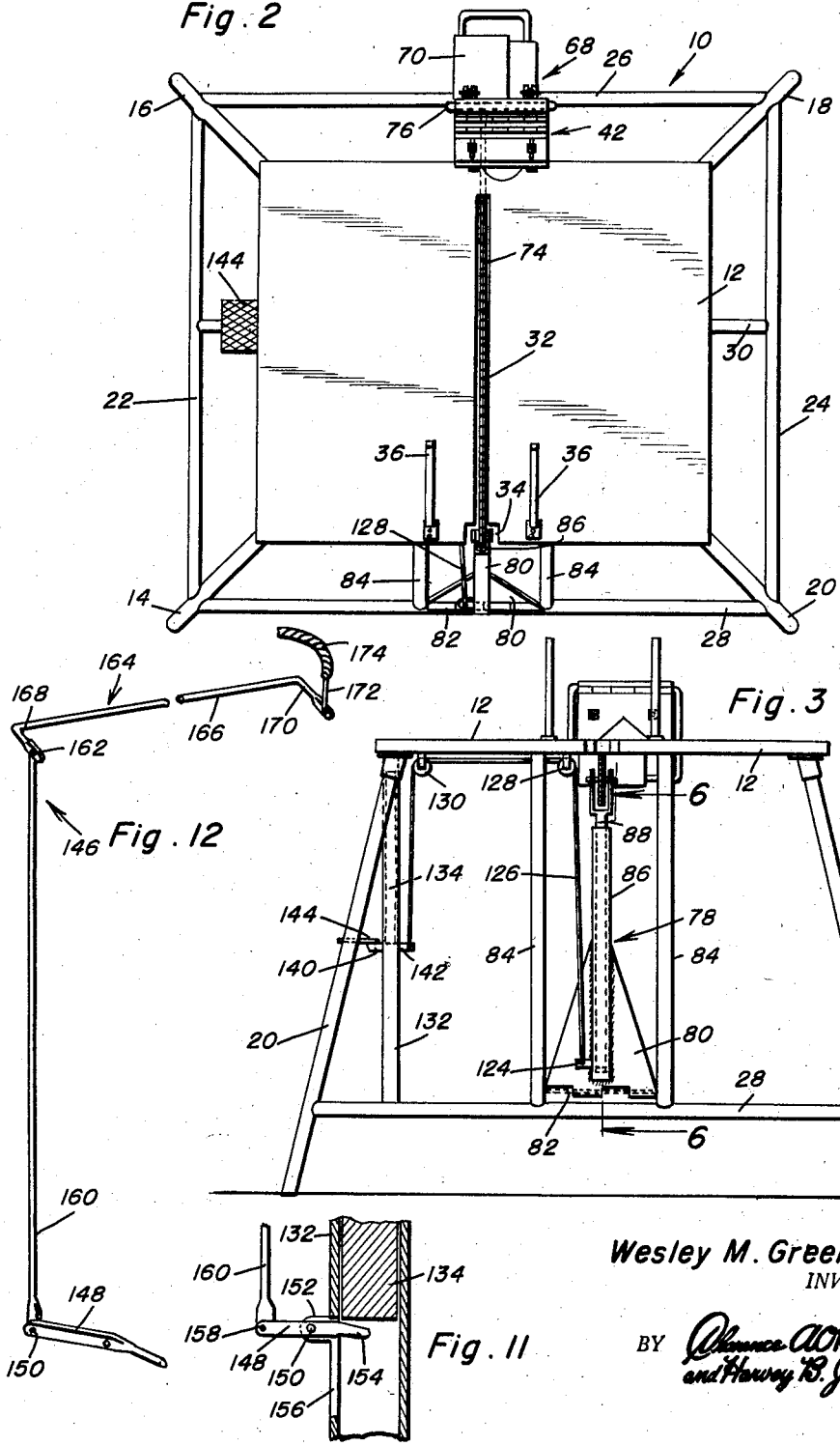
Wesley M. Greenslate
INVENTOR.

Sept. 9, 1958     W. M. GREENSLATE     2,851,067
CHAIN SAW TABLE
Filed July 9, 1956     3 Sheets–Sheet 3
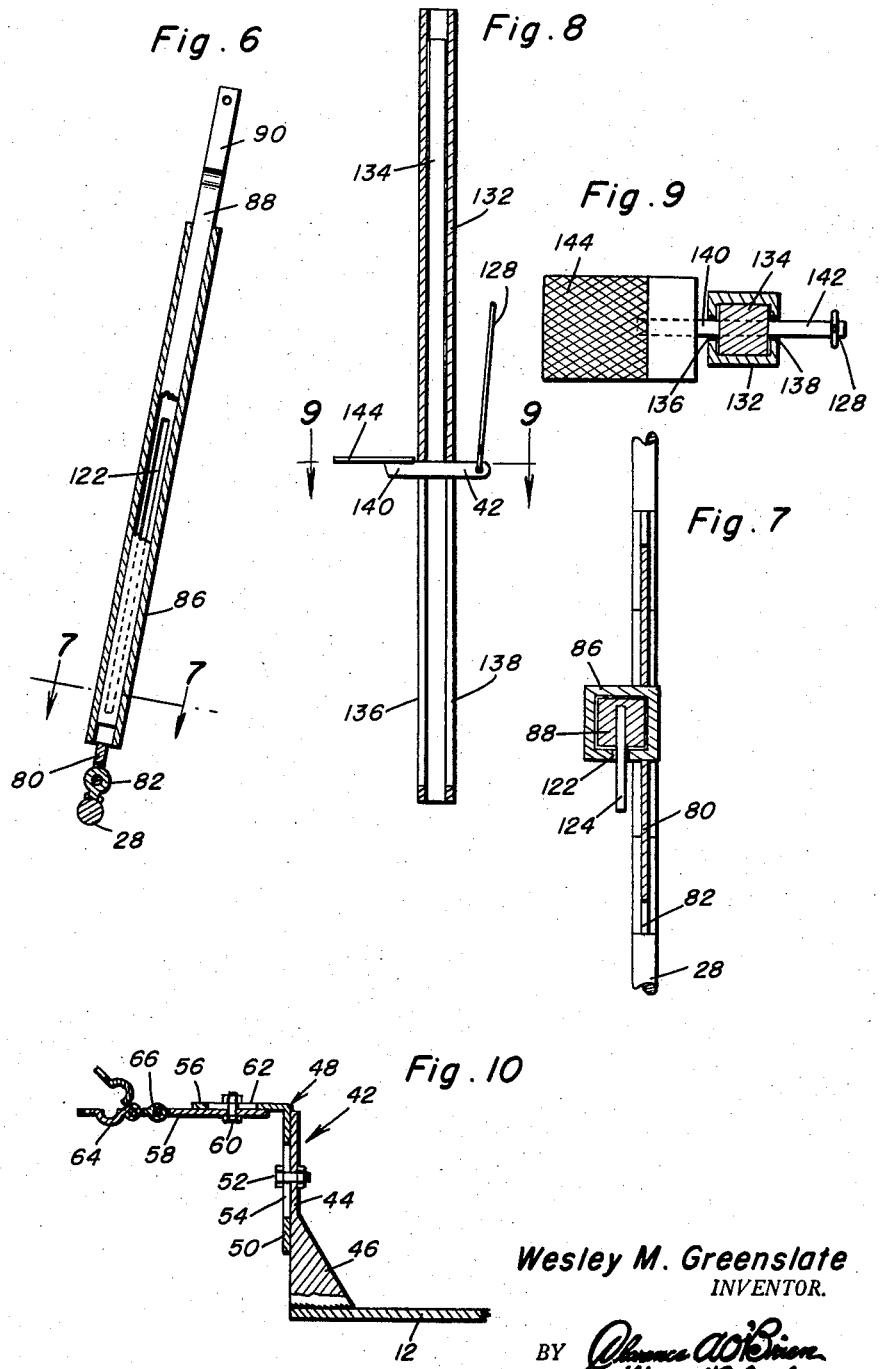
Wesley M. Greenslate
INVENTOR.

United States Patent Office 2,851,067
Patented Sept. 9, 1958

2,851,067

CHAIN SAW TABLE

Wesley M. Greenslate, Jackson, Calif.

Application July 9, 1956, Serial No. 596,535

3 Claims. (Cl. 143—32)

This invention relates in general to new and useful improvements in woodworking equipment, and more specifically to an improved table for a chain saw.

At the present time there are in use many chain saws which are portable. While such chain saws are used efficiently for cutting down trees and for bucking logs and the like, when small diametered pieces of wood, such as small limbs or the like, are to be cut up, it is inconvenient to use a chain saw in the conventional manner. It is therefore the primary object of this invention to provide an improved table which is so constructed whereby a chain saw may be mounted thereon to convert the chain saw into a table saw.

Another object of this invention is to provide an improved table for mounting a chain saw, the table being so constructed whereby a chain saw may be suitably mounted beneath a platform thereof, the platform being provided with a slot therethrough which the chain saw may pass up through in order to cut limbs and other pieces of wood positioned on the platform.

Another object of this invention is to provide an improved table for mounting a chain saw for converting the chain saw into a table saw, the table being provided with suitable supports for pivotally mounting the motor end of a chain saw and for selectively elevating the opposite end of the chain saw whereby the chain saw may be advanced through a piece of wood which is desired to be cut.

A further object of this invention is to provide an improved table for mounting a chain saw for pivotal movement, there being provided suitable means for elevating the chain saw relative to a platform of the table, the means including a foot operated pedal which permits the ease of operation of the chain saw and at the same time leaves both hands free to grasp the wood being cut.

A still further object of this invention is to provide an improved chain saw supporting table, the table being provided with suitable operative means for controlling the operation of the chain saw, the operating means including a foot pedal for simultaneously elevating the chain saw into an operative position and for controlling the throttle thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the chain saw table which is the subject of this invention and shows mounted thereon in an inoperative position a chain saw, a log to be cut by the chain saw being shown in phantom lines;

Figure 2 is a top plan view of the chain saw table and shows further the relationship of the chain saw with respect thereto;

Figure 3 is an end view of the chain saw table of Figure 1 and shows the means for supporting the end of the chain saw remote from the motor thereof for selective vertical movement;

Figure 4 is an enlarged fragmentary sectional view taken through the end of the chain saw remote from the motor and shows the specific details of pivotally mounting the same on a slide member;

Figure 5 is an enlarged sectional view taken through a supporting shaft for the chain saw;

Figure 6 is an enlarged fragmentary sectional view taken substantially upon the plan indicated by the section line 6—6 of Figure 3 and shows the specific details of the slide member and the pivotal mounting of a guide therefor;

Figure 7 is an enlarged fragmentary horizontal sectional view taken substantially upon the plane indicated by the section line 7—7 of Figure 6 and shows the specific relationship between the slide member and the guide member therefor;

Figure 8 is an enlarged fragmentary sectional view taken substantially upon the plane indicated by the section line 8—8 of Figure 1 and shows the specific details of a foot pedal operator for vertically moving the chain saw blade from the inoperative position of Figure 1 to an operative position;

Figure 9 is an enlarged fragmentary horizontal sectional view taken substantially upon the plane indicated by the section line 9—9 of Figure 8 and shows the specific details of the foot pedal operator and a guide therefor;

Figure 10 is an enlarged fragmentary sectional view taken through a mounting bracket and shows the details thereof, the mounting bracket being for pivotally mounting the motor end of a chain saw;

Figure 11 is an enlarged fragmentary sectional view taken through a portion of the guide for the foot pedal operator and shows the specific details of a lever for operating the throttle of the chain saw; and Figure 12 is a fragmentary perspective view on an enlarged scale showing the details of the linkage for the throttle control.

Referring now to the drawings in detail, it will be seen that there is illustrated the chain saw table which is the subject of this invention, the table being referred to in general by the reference numeral 10. The table 10 includes an elevated platform 12 which is generally rectangular in outline. Extending downwardly and outwardly from the corners of the table 12 are legs 14, 16, 18 and 20. Extending between the lower portions of the legs 14 and 16 is a horizontal brace 22. A similar brace 24 extends between the lower portions of the legs 18 and 20. Additional braces 26 and 28 extend between the legs 16 and 18 and the legs 14 and 20, respectively. The braces 22 and 24 are connected together by an intermediate brace 30.

The legs 14, 16 and 18 and 20 are of a length to support the platform 12 of a desired height. Extending transversely of the platform 12 and opening through one end thereof is a slot 32, the slot 32 being enlarged as at 34 where it opens through one end of the platform 12. Disposed on opposite sides of the slot 32 adjacent the opening 34 are log hold-downs 36 which extend upwardly at an angle to the platform 12 and are provided with depending teeth 38 for gripping a log to be cut, such as the log 40 to prevent both upward movement thereof and rotation thereof.

Referring now to Figures 1 and 10 in particular, it will be seen that there is illustrated a saw mounting bracket which is referred to in general by the reference numeral 42. The saw mounting bracket 42 includes a vertical plate 44 which extends upwardly from one side of the platform 12 and is braced relative thereto by a gusset 46. The mounting bracket 42 also includes an angle member 48 which has a vertical flange 50 disposed in face to face engagement with the plate 44 and which is adjustably secured thereto by a fastener 52, the fastener 52 passing through a vertical slot 54 in the vertical flange 50.

Angle member 48 also includes a horizontal flange 56 which extends away from the platform 12. The horizontal flange 56 overlies a plate 58 which is connected thereto by a fastener 60. Adjustment of the plate 58 is accomplished by the provision of a slot 62 in the flange 56 and the passing of the fastener 60 through the slot 62.

Hingedly connected to the plate 58 remote from the angle member 48 is a saw clamp 64, the saw clamp 64 being hingedly connected to the plate 58 by means of a hinge 66.

Referring now to Figure 1 in particular, it will be seen that there is illustrated a chain saw of a conventional type, the chain saw being referred to in general by the reference numeral 68. The chain saw 68, among other features, includes a motor 70, a chain blade guide 72 carried by the motor 70 and a chain blade 74 mounted on the guide 72 and driven by the engine 70. Secured to the housing of the engine 70 is a support bracket 76 which is releasably mounted relative to the platform 12 by means of the clamp 64 and the supporting elements therefor.

In order that the end of the chain saw 60 remote from the engine 70 may be supported and vertically positioned as desired, in order to effect the cutting of the log, such as the log 40, there is provided support means which are referred to in general by the reference numeral 78. The support means 78 includes a plate 80 which is hingedly connected by means of a hinge 82 to an intermediate portion of the brace 28. The brace 28 is braced relative to the platform 12 on opposite ends of the hinge 82 by means of additional braces 84. Secured to the plate 80 and extending upwardly therefrom is a tubular guide 86 on which there is guidingly disposed in telescoping relation a slide member 88.

Referring now to Figure 4 in particular, it will be seen that the upper end of the slide member 88 is bifurcated to form a pair of legs 90. Extending between upper parts of the legs 90 is a shaft assembly 92 which pivotally supports the chain blade guide 72.

Referring now to Figure 5 in particular, it will be seen that the shaft assembly 92 includes a first shaft section 94 which is provided with an internally threaded bore 96 at one end thereof. The shaft assembly 92 also includes a second shaft section 98 which is provided with an externally threaded reduced extension 100, the extension 100 being threadedly engaged in the bore 96 for releasably connecting the shaft sections 94 and 98 in alignment with each other. The shaft sections 94 and 98 are provided at their free ends with screw driver slots 102 and 104, respectively, for selectively restraining the shaft sections 94 and 98 against rotation or for turning the same to link the two together.

The opposed ends of the shaft sections 94 and 98 are provided with external threads 106 and 108, respectively. Threadedly engaged on the thread 106 is a collar 110. A similar collar 112 is threadedly engaged on the threads 108. The chain blade guide 72 is mounted on the shaft assembly 92 in the desired position by the clamping actions of the collars 110 and 112.

The shaft section 94 is provided with a slidable collar 114 which is retained in place by a setscrew 116. The shaft section 98 has a similar collar 118 which is retained in place by a set screw 120.

The outer portion of the shaft sections 94 and 98 are rotatably journaled in the legs 90 and are restrained against transverse movement by the collar 114 and 118.

Referring now to Figures 6 and 7 in particular, it will be seen that the guide 86 is provided with a vertical slot 122 in the lower portion thereof. Secured to the lower part of the slide member 88 and projecting through the slot 122 is a connecting ear 124. Extending upwardly from the connecting ear 124 is a cable 126 which is entrained over a pulley 128 secured to the underside of the platform 12. The cable 126 extends horizontally under the platform 12 and is entrained over a second pulley 130 also secured to the underside of the platform 12. The cable 126 extends vertically downwardly from the pulley 130.

Extending vertically downwardly from one side of the platform 12 and having its lower end secured to the brace 30 is a tubular guide 132. The tubular guide 132 is disposed in alignment with the pulley 130 and has mounted therein for vertical movement a guide member 134. The lower portion of the tubular guide 132 is provided with opposed slots 136 and 138. Secured to the lower part of the guide member 134 and projecting through the slots 136 and 138 are ears 140 and 142, respectively. Mounted on the ear 140 is a foot pedal operator 144. The cable 126 is connected to the ear 142.

In order that the foot pedal operator 144 may also control the throttle of the engine 70 to increase the speed thereof and thereby permitting the engine 70 to idle when the chain saw 68 is not being actively used, there is provided a throttle control which is referred to in general by the reference numeral 146. The throttle control 146 includes a lever 148 which is pivotally mounted on the guide 132 by means of a pivot pin 150 carried by a pair of ears 152. The lever 148 has an end 154 projecting into the guide 132 below the guide member 34, the lever 148 projecting through a vertical slot 156 in the guide 132.

Pivotally connected to the opposite end of the lever 148 by means of a pivot pin 158 is a rod 160, the rod 160 extends substantially vertically and is pivotally connected by means of a pin 162 to a crank 164. The crank 164 includes a horizontal shaft portion 166 which is pivotally mounted on the underside of the platform 12. One end of the shaft 166 includes an arm 168 carrying the pin 162. The opposite end of the shaft portion 166 is in the form of an arm 170 which is connected to a control wire 172 which is mounted in a flexible housing 174. The opposite end of the control wire 172 is connected to the throttle (not shown) of the engine 70 for controlling the speed thereof.

A normal position of the chain saw 68 is illustrated in Figure 1. The log, such as the log 40, to be cut by the chain saw 68 is positioned as is best illustrated in Figure 1. Then the chain saw 68 is pivoted upwardly into engagement with the log 40 by depressing the foot pedal operator 144. When the foot pedal operator 144 is depressed, the cable 126 is pulled to move the slide member 88 up relative to the guide member 86, thus advancing the end of the chain saw remote from the engine 70. When the foot pedal operator 144 is depressed, the giude member 134 engages the lever 148 and operates a control linkage 146 to increase the engine speed, whereby the engine 70 will be running at a maximum speed when the chain blade 74 first engages the log 40. The foot pedal operator 144 is continued to be depressed until such time as the chain blade 74 has cut completely through the log 40.

It is pointed out that the teeth 38 on the log retainers 36 are so positioned whereby they both prevent upward movement of the log 40 and the rolling thereof during a sawing operation.

From the foregoing description of the present invention, it will be readily apparent that there has been devised suitable means for simply mounting existing chain saws whereby the chain saws may be used as table saws with maximum efficiency for cutting small pieces of wood.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A table for converting a portable chain saw into a table saw, said table comprising a platform, supports mounting said platform in an elevated position, a transverse slot in said platform, means for mounting a chain saw beneath said platform in alignment with said slot, said means including a mounting bracket for pivotally mounting one end of a chain saw, and control means for selectively elevating an opposite end of a chain saw for passing a blade thereof through said slot, said control means including a foot pedal operator, a throttle control mechanism carried by said supports and actuated by said foot pedal operator.

2. A table for converting a portable chain saw into a table saw, said table comprising a platform, supports mounting said platform, in an elevated position, a transverse slot in said platform, means for mounting a chain saw beneath said platform in alignment with said slot, said means including a mounting bracket for pivotally mounting one end of a chain saw, and control means for selectively elevating an opposite end of a chain saw for passing a blade thereof through said slot, said control means including a slide member, guide means of said slide member carried by said supports, means connecting an upper end of said slide member to a chain saw, and operator means connected to said slide member for moving said slide member vertically, said operator means being in the form of a foot pedal operator, a throttle control mechanism carried by said supports and actuated by said foot pedal operator.

3. A table for converting a portable chain saw into a table saw, said table comprising a platform, supports mounting said platform in an elevated position, a transverse slot in said platform, means for mounting a chain saw beneath said platform in alignment with said slot, said means including a mounting bracket for pivotally mounting one end of a chain saw, and control means for selectively elevating an opposite end of a chain saw for passing a blade thereof through said slot, said control means including a slide member, guide means for said slide member carried by said supports, means connecting an upper end of said slide member to a chain saw, and operator means connected to said slide member for moving said slide member vertically, said guide means being pivotally connected to said supports to compensate for the pivoting of a chain saw, said operator means being in the form of a foot pedal operator, a throttle control mechanism carried by said supports and actuated by said foot pedal operator.

References Cited in the file of this patent

UNITED STATES PATENTS

| | | |
|---|---|---|
| 1,584,086 | Fonda | May 11, 1926 |
| 1,861,880 | Rarig | June 7, 1932 |
| 2,488,077 | Buday | Nov. 15, 1949 |
| 2,683,475 | Miller | July 13, 1954 |
| 2,719,547 | Gjerde | Oct. 4, 1955 |

FOREIGN PATENTS

| | | |
|---|---|---|
| 243,406 | Switzerland | Dec. 16, 1946 |
| 690,791 | Germany | May 7, 1940 |